United States Patent

[11] 3,628,549

[72] Inventor Endre A. Mayer
Birmingham, Mich.
[21] Appl. No. 4,387
[22] Filed Jan. 20, 1970
[45] Patented Dec. 21, 1971
[73] Assignee The Bendix Corporation

[54] METHOD AND VORTEX PRESSURE REGULATING APPARATUS
14 Claims, 8 Drawing Figs.

[52] U.S. Cl. .................................................. 137/13, 137/81.5
[51] Int. Cl. ...................................................... F15c 1/16
[50] Field of Search ............................................ 137/81.5, 13, 83, 455

[56] References Cited
UNITED STATES PATENTS
3,424,182  1/1969  Mayer ........................... 137/81.5
3,473,545  10/1969  Boyadjieff ..................... 137/81.5
3,515,158  6/1970  Utz ................................ 137/81.5

Primary Examiner—William R. Cline
Attorneys—John R. Benefield and Plante, Hartz, Smith & Thompson ABSTRACT: A pressure regulator for maintaining inlet pressure to a fluid device over a range of flow rates to or from the fluid device, using a vortex valve with vertical pressure flow characteristics, connected with the supply inlet in parallel with the fluid device inlet and with a constant control pressure applied. The supply and control flow rates for the given value of regulated pressure are designed so that the range of flow rates experienced because of fluid device inlet flow fluctuations falls in the vertical pressure flow range of the vortex valve. In a second version, the supply and control flow rates are selectively variable so that the pressure regulator may operate in different ranges of regulated pressure values while still operating in the vertical pressure flow range of the vortex valve. A third version provides for pressure regulation at the inlet of an active load element.

INVENTOR.
Endre A. Mayer
BY
John R. Benefiel
ATTORNEY.

METHOD AND VORTEX PRESSURE REGULATING APPARATUS

BACKGROUND OF THE INVENTION

The existence of the growing field of fluidics has increased the need for means to provide a regulated pressure source which will maintain a given pressure level at the inlet to a load or fluid circuit over a substantial range of flow rates.

In addition, in a great number of other present pressure regulator applications, it would be highly advantageous to eliminate the prior art mechanical valve pressure regulator in favor of a purely fluidic device, since reliability would be substantially increased while reducing the manufacturing costs.

Therefore, it is an object of the present invention to provide a pressure regulator for a system supply which will maintain a given pressure.

It is a further object to provide a purely fluidic pressure regulator, without moving operating parts.

SUMMARY OF THE INVENTION

These and other objects which will become apparent upon a reading of the following specification and claims are accomplished by using a vortex valve having a vertical pressure flow characteristic, with the system connected in parallel to the vortex valve supply and with the control pressure set at a constant value. The supply flow rate at the given pressure level and the control pressure are adjusted so that the load flow fluctuations fall in the vertical pressure-flow range of the vortex valve.

DESCRIPTION OF THE DRAWINGS

FIG. 7 is a schematic of a single control variable range vortex valve pressure regulator arrangement.

DETAILED DESCRIPTION

In the following description, certain specific terminology will be used and a specific embodiment will be described in order to provide a full and complete description of the invention, but it is to be understood the invention is not to be so limited, as many variations are possible without departing from the spirit of the present invention.

Figure 1:
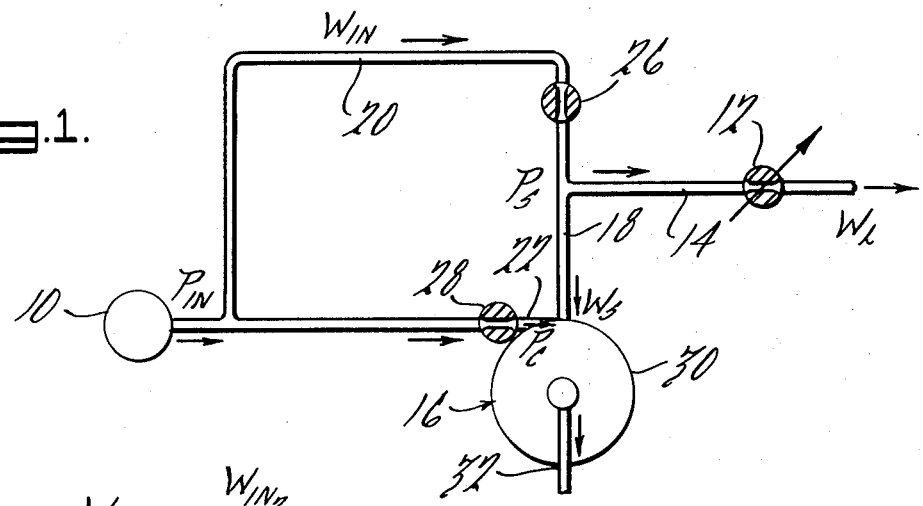
FIG. 1 is a schematic representation of the basic vortex valve pressure regulator arrangement.

Referring now to the drawings and particularly to FIG. 1, 10 indicates a source of fluid pressure $P_{in}$ while 12 represents the load, which is indicated as producing variable flow rate demands $W_L$. The pressure to be regulated, $P_s$, is that applied to the load inlet 14.

This is accomplished by providing a vortex valve 16 which is connected with its radial supply port 18 in parallel to the load 12 via line 20 and its tangential control port 22 connected to the pressure source 10 via line 24.

In order to provide a set flow rate, $W_{in}$, in line 20, for a given regulated pressure, a series orifice 26 is provided, and in order to produce a controlled value of control momentum, a control orifice 28 is provided.

The vortex valve 16 per se is well known in the prior art and a full description is not felt to be necessary herein, but suffice it to say that it is composed of a supply port emptying radially into a vortex chamber 30 and a control port entering tangentially into the vortex chamber, with a centrally located exhaust 32.

The ultimate effect of the control pressure $P_c$ is to control the vortex chamber pressure which in turn controls flow from the supply 14 to the exhaust 32, in a manner well known in the prior art.

The vortex valve 16, however, must have what is referred to as vertical pressure-flow characteristics. That is, in a portion of its operating range, a constant valve of control pressure $P_c$ will provide a range of flow rates at substantially constant supply port pressures $P_s$. This is represented graphically in FIG. 2 as the portion of the $W_s$ curve between A and B.

This can be obtained from the vortex valve described in U.S. Pat. No. 3,424,182, usually referred to as an annular or "button" vortex valve. A complete analysis and understanding of the vertical pressure-flow characteristic may be obtained from "Vortex Devices" by the present inventor and L. B. Taplin, a part of "Technical Appendix of Fluidics" published by Fluid Amplifiers Associates, Inc., Boston, Mass.

This characteristic is utilized in the present invention to provide a constant inlet pressure $P_s$ over a range of load flow rates values $W_L$ by the arrangement shown in FIG. 1. The control pressure $P_c$ is held constant, and is the source pressure $P_{in}$ for the present embodiment.

Conduit 20 will then supply fluid to supply port 18 and to the load 12, to provide a common fluid connection with the pressure source 10 so that the total flow going to the supply port 18 and load 12 is controlled thereby, with the proportion going to each determined by the flow rate $W_L$ called for by the load demand. If the vortex valve 16 is operating in its vertical pressure-flow operating range, variations in fluid flow through the supply port 18 will not cause variations in pressure, hence providing the regulated inlet pressure to the load.

Figure 2:
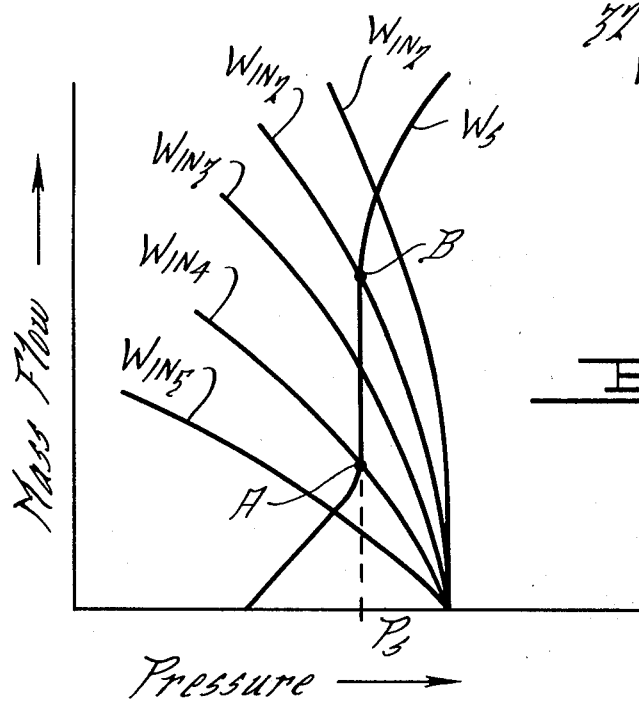
FIG. 2 is a graphical representation of the solution for the proper supply flow rate and control pressure values for a given value of regulated pressure for the system of FIG. 1.

FIG. 2 demonstrates graphically how to determine the flow values across the series and control orifices to insure that the vortex valve 16 will be operating in its vertical pressure-flow range at the pressure level $P_s$ desired to be maintained. Trace $W_s$ is a plotting of the $P_s$ values of supply flow $W_s$ against supply pressure for a given control pressure $P_s$, which is arrived at from the value of the source pressure $P_{in}$ and the configuration of the control orifice 28. These should be designed so that the segment AB lies at the value of $P_s$ desired to be maintained.

Traces $W_{in1}$ through $W_{in5}$ are plottings of flow through conduit 20 $W_{in}$ against pressure $P_s$ downstream of series orifice 26, for various orifice sizes at the value of $P_{in}$ used to arrive at trace $W_s$.

In order to insure that $W_{in}$ will equal $W_s$ at zero load flow $W_L$, the orifice size is selected such that the intersection of the $W_{in}$ trace and the $W_s$ trace occurs at the upper portion of the vertical segment AB. This is necessary since $W_{in}$ must supply all of the supply flow $W_s$ when the load flow $W_L$ is zero. If when $W_L=0$ the flow $W_{in}$ is greater than $W_s$ at regulated pressure value $P_s$ as depicted by trace $W_{in}$, the pressure at the supply port 18 will increase, since the vortex 16 is now operating on the curved portion of the trace $W_s$ above AB.

Similarly, if when the $W_L=0$ the flow $W_{in}$ is less than $W_s$ as depicted by $W_{in5}$, the pressure at supply port 18 will decrease, since the vortex valve 16 will not be operating on the lower curved portion below A.

If the value of $W_{in}$ at regulated pressure $P_s$ is intermediate A and B the flow rate fluctuation of $W_s$ is less than that which could be allowed be the vortex valve 16, since the value of $W_{in}$ at $P_s$ less the value of $W_L$ cannot decline to less than that at A without causing a pressure drop at the inlet 18 and consequent drop in regulated pressure $P_s$ since the vortex valve would then be operating on the lower curved portion below A.

Hence, in order to obtain the maximum potential range of $W_L$ fluctuations, the orifice 26 should be selected to cause a flow rate characteristic depicted by $W_{in2}$, intersecting trace $W_s$ at B, or the upper most point of the vertical control range of the vortex valve 16, but in any event must provide a flow $W_{in} = W_s = B$ at $P_s$ when $W_L = 0$ and $W_{in} - W_L = W_s = A$ when $W_L$ = maximum flow rate in order to provide a constant $P_s$.

An examination of FIG. 2 will reveal that only a single value of regulated pressure can be obtained with this arrangement for a given value of source pressure, since the control pressure $P_c$ must be held constant to obtain an output corresponding to trace $W_s$ in FIG. 2.

Figure 3:
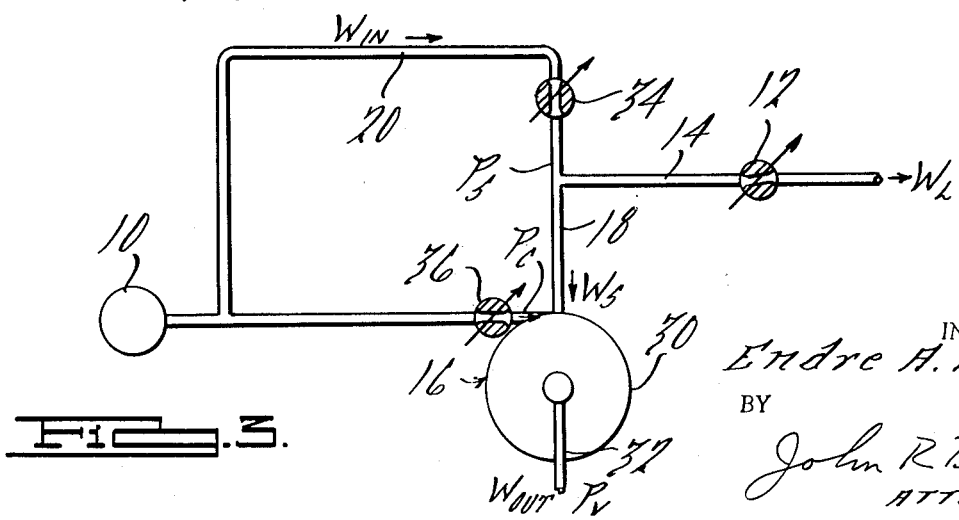
FIG. 3 is a schematic representation of a variable range vortex valve regulator arrangement.
Figure 2:
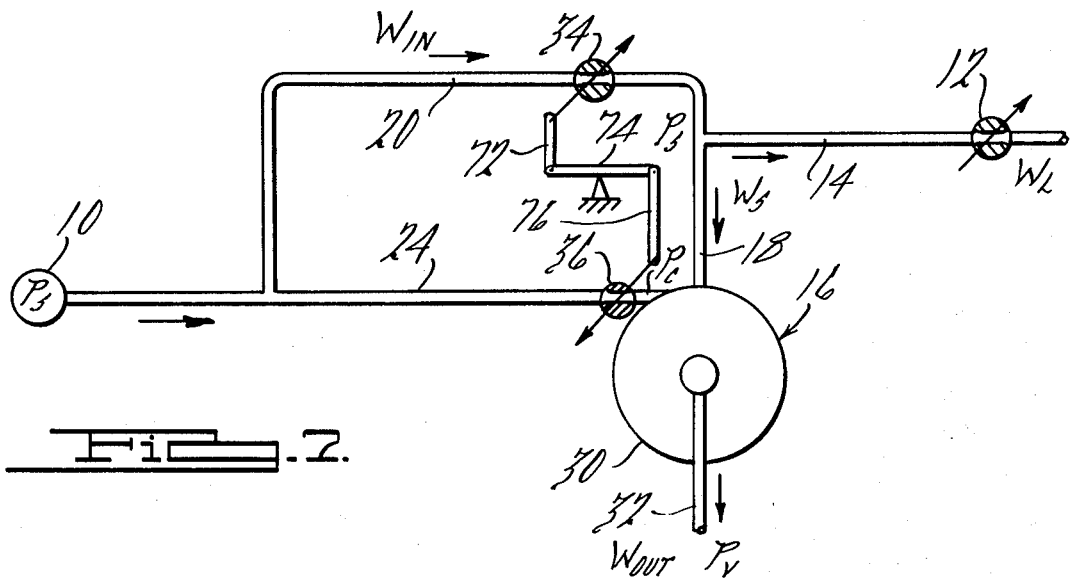

In order to provide flexibility of application of the invention, the orifices of the embodiment shown in FIG. 1 can be made variable, as shown schematically in FIG. 3. By adjusting control orifice 36, a family of outputs depicted by traces $W_{s_1}$, $W_{s_2}$, in FIG. 7 can be obtained, one for each orifice setting, corresponding to varying values of control momentum for a given value of $P_{in}$. Each of these settings will produce vertical pressure-flow ranges $A_1 B_1$, $A_2 B_2$ occurring at different pressure values $P_{s_1}$, $P_{s_2}$, hence providing the capacity to maintain different pressure values $P_s$.

Figure 4:
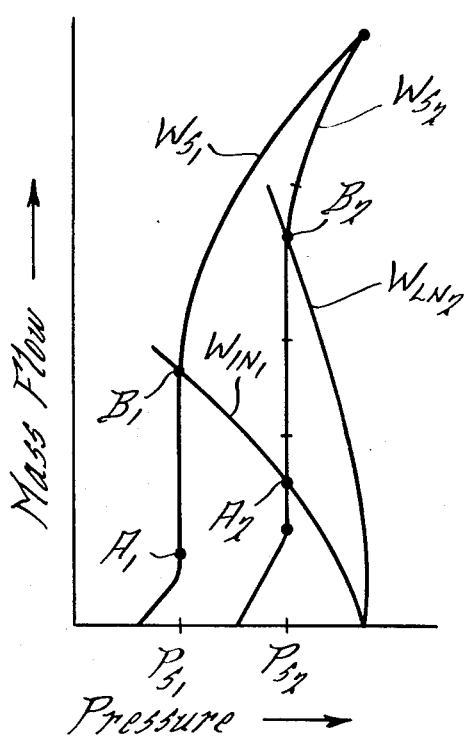
FIG. 4 is a graphical representation of the characteristics of the system of FIG. 3 adjusted to two different regulated pressure values.

In order to insure that the vortex valve 16 will be operating in its vertical pressure-flow range for each setting of control orifice 36, the series orifice 34 is also made adjustable. As depicted in FIG. 4 by traces $W_{in_1}$, $W_{in_2}$, the series orifice is adjusted so that flow rates $W_{in}$ occur at pressures $P_{s_1}$, $P_{s_2}$ as explained supra.

Thus, a range of pressure values $P_s$ may be maintained by this arrangement with the maximum flow fluctuation in $W_L$ possible from each pressure value $P_s$ provided.

Figure 5:
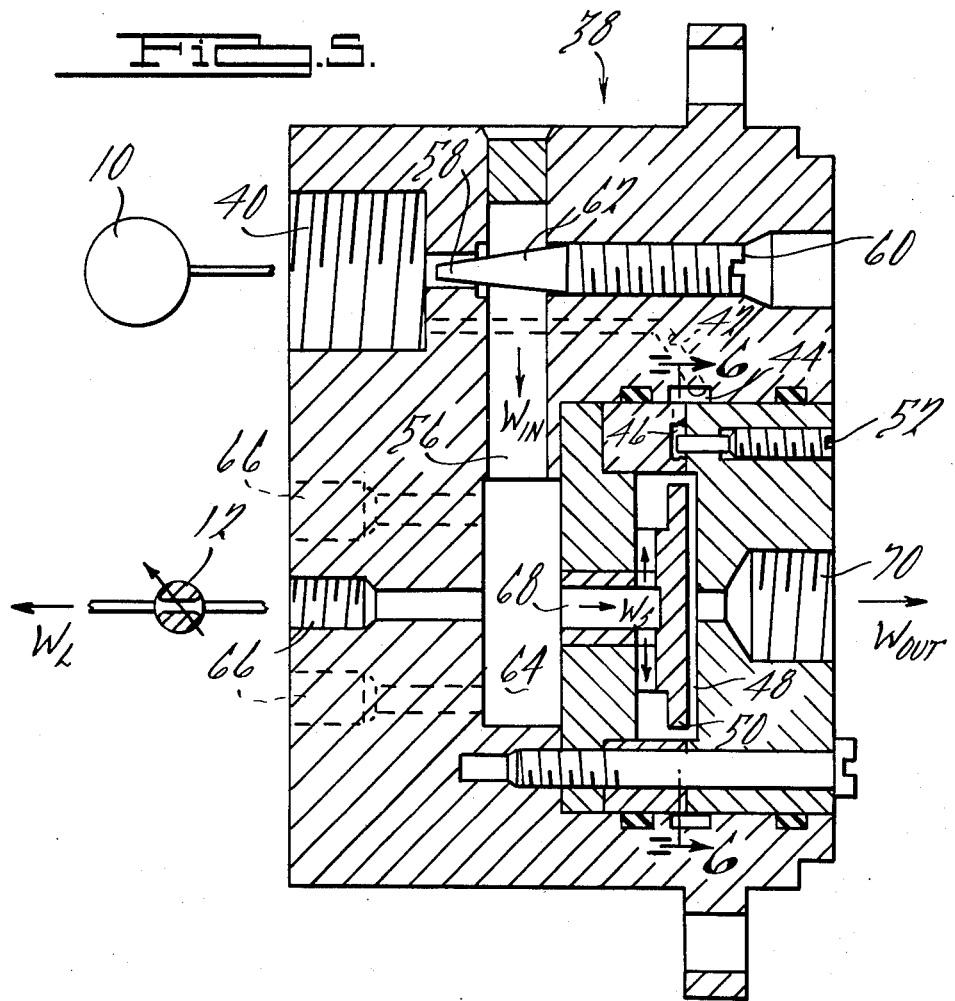
FIG. 5 is a sectional view of an actual embodiment of a variable range vortex valve pressure regulator.

An actual embodiment for a variable orifice vortex pressure regulator valve 38 is shown in section in FIG. 5. An inlet port 40 is provided adapted to be connected to the pressure source 10.

Figure 6:
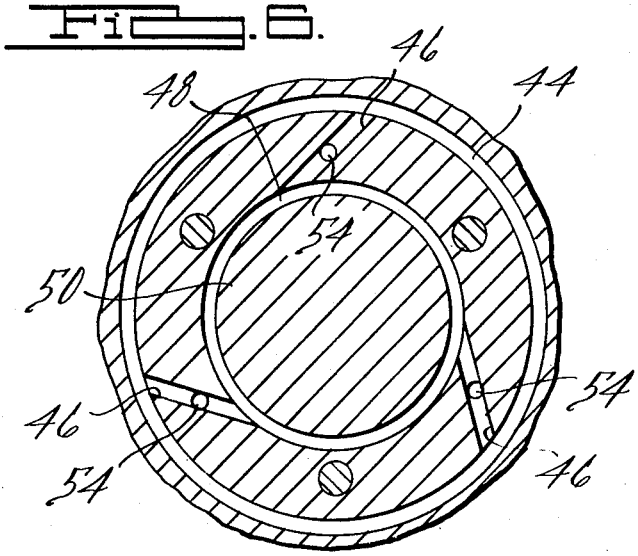
FIG. 6 is a view of the section 6—6 in FIG. 5—5.

Communicating with the inlet port 40 is passage 42, in turn communicating with annular chamber 44 which acts as a supply plenum for the control passage 46, which enters a vortex chamber 48 tangentially adjacent the button element 50 (FIG. 6).

Flow through the control passage 46 is varied by means of three control screws 52 having cylindrical ends 54, which serve to adjustably block the passages 46, corresponding to orifice 36 of FIG. 3. It has been found the adjustment of single screw will provide satisfactory control for the purposes of the present invention.

Inlet port 40 also communicates with passage 56 through orifice 58, which is adjustably blocked by means of screw 60 having a tapering tip 62 which blocks orifice 58 more or less as the screw 60 is advanced and retracted. This corresponds to orifice 34 in FIG. 3.

Passage 56 communicates with plenum chamber 64, which supplies fluid to the load 12 via output ports 66 and also with supply port 68 which is the supply to the vortex chamber 48. Vortex chamber is vented at 70. This device will function like the arrangement depicted schematically in FIG. 3.

Since both orifices are varied in order to shift from one pressure setting to another, the adjustment mechanisms may be linked together in order to provide simultaneous adjustment with a single control. This arrangement is shown schematically in FIG. 7, wherein the variable orifices are linked via links 72, 74, 76, whereby adjustment of one orifice automatically adjusts the other. The motion of the linkages should be such that the adjusting orifice 34 so as to cause a shift corresponding to traces $W_{s_1}$ and $W_{s_2}$ is accompanied by a shift from $W_{in_1}$ to $W_{in_2}$.

Alternatively, an arrangement whereby the button 50 may be used to simultaneously adjust the supply and control orifices is also possible to accomplish this same end.

In the above described arrangements, the tailoring of the flow rate $W_{in}$ and the control pressure $P_c$ to coincide at the upper portion of vertical pressure-flow operating range was predicated on a load device with a flow rate $W_l$ which varies from zero to some specified maximum flow.

However, this arrangement will also be effective to control inlet pressure for a device which is sometimes or always "active," that is, flow occurs out of the device back into the supply circuit.

The existence of this circumstance will affect the approach to the tailoring of the flow $W_{in_1}$ depending on the nature of the load device.

Figure 8:
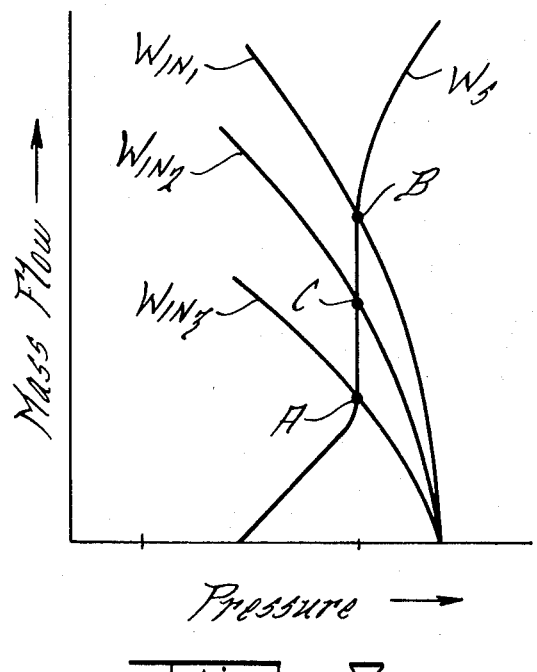
FIG. 8 is a graphical representation of the solution for the proper supply flow rate and control pressure valves for the vortex valve used with an active load system.

Referring to FIG. 8, if the device is entirely passive, the flow rate $W_{in_1}$ should correspond to that depicted in trace $W_{in_1}$ as explained and described infra.

On the other hand, if the load device is both active and passive in equal amounts, the flow rate $W_{in}$ should be adjusted to correspond to that represented by $W_{in_2}$, i.e., equal to C at the regulated pressure $P_s$. This is to allow some range in both active and passive conditions of the load. This can be understood by appreciating that the flow $W_s$ must be supplied from the algebraic sum of $W_{in}$ and $W_L$ (algebraic if $W_L$ can be negative in the sense that flow occurs out of the system) and must be equal to a flow rate value between A and B if the pressure $P_s$ is to be maintained. Hence, if $W_{in} = B$ and $W_L$ is negative due to being in an active state, the total flow $W_s$ will exceed B and the pressure level $P_s$ will rise with the curved portion of trace $W_s$.

Therefore, by adjusting the flow $W_{in}$ to C at $P_s$, some range both above and below the totaly flow $W_s = C$ is provided.

On the other hand, if the load device is entirely active, adjustment of flow $W_{in}$ to that corresponding to trace $W_{in}$ would allow the full range above A, conversely to the totally passive load.

From the above detailed description it should be appreciated that a low cost, reliable pressure regulator having no moving operating parts has been provided, which will maintain a constant value of pressure over a range of load flow rates.

It should also be appreciated that the invention may be practiced in a wide variety of embodiments and is not to be limited to those shown and described, but only by the broadest interpretation of the appended claims. For example, in the embodiment of FIGS. 1 and 2, a separate supply and control inlet may be eliminated in favor of a common control and supply inlet directed at a bias to the axis of the vortex chamber, commonly referred to as a "mechanical bias" vortex valve. Or a separate source of control pressure, apart from the common source shown may be provided.

What is claimed is:

1. A pressure regulator arrangement for a fluid system comprising:
    a vortex device including means for admitting control fluid pressure, means for admitting supply fluid pressure, a vortex chamber, and an exhaust, said vortex device including means for providing a vertical pressure flow characteristic in at least a portion of its operating range for specific values of control and supply pressures in which a range os supply flow rates at a substantially constant supply pressure can occur;
    means for providing a controlled value of control fluid pressure to said vortex device to provide a specific vertical pressure flow characteristic;
    means for providing fluid under pressure to said means for admitting supply pressure at a pressure value corresponding to said specific vertical pressure flow characteristic;
    means for providing a controlled total flow to said means for admitting supply pressure and said system whereby said pressure supplied to said system may be substantially maintained over a range of flow rates to or from said system.

2. The arrangement of claim 1 wherein said means providing a controlled total fluid flow rate provides such flow at the rate equal to the fluid flow rate at the upper portion of said vertical pressure-flow operating range, whereby a constant pressure may be maintained through a range of said system flow rate demands down to zero demand.

3. The arrangement of claim 1 further including control adjustment means to adjust the controlled value of control fluid pressure supplied to said vortex device whereby a range of supply pressure values may be maintained by said arrangement.

4. The arrangement of claim 1 further including supply adjustment means to adjustably control the total flow rate to said vortex device supply and said system under the same pressure conditions at said vortex supply whereby said flow rate may be adjusted to utilize the maximum range available of the specific vertical pressure flow characteristics of said vortex device corresponding to said controlled values of control pressure.

5. The arrangement of claim 4 further including means drivingly connecting said control and supply adjustment means so that adjustment of one of said adjustment means results in adjustment of the other of said adjustment means.

6. The arrangement of claim 1 wherein said means providing a controlled total fluid flow rate provides such flow at the rate equal to the fluid flow rate intermediate the upper and lower limit flow rates in said vertical pressure flow range, whereby said pressure to said system may be maintained over a range of flow rates to or from said system equal to said upper and lower limits respectively of said vertical pressure flow range.

7. The arrangement of claim 1 wherein said vortex device is a vortex valve of the button type.

8. A method of maintaining a given fluid pressure value at a point in a fluid system over a range of flow rates to or from said point comprising the steps of:
providing fluid under a given pressure value to both the supply inlet of a vortex device having a vertical pressure flow characteristic and said point in said system by means of a common fluid connection to a fluid source;
applying control pressure to said vortex device of the proper magnitude so that the vertical pressure flow characteristic of said vortex device occurs at said given pressure value, whereby flow rates through said vertical control portion of said vortex device operating range can take place while said given pressure value is maintained.

9. The method of claim 8 further including the steps of adjusting the flow rate from said source to said supply inlet and said point at said given pressure value to that occurring at the uppermost range os said vertical pressure flow portion of said vortex device operating range, whereby flow variations from that at said uppermost range down to zero flow may occur while said given pressure value is maintained.

10. The method of claim 8 further including the step of adjusting the flow rate from said fluid source to said supply inlet and said point at said given pressure value to that occurring intermediate the higher and lower values of flow rates occurring at said vertical pressure flow portion of the operating range of said vortex device, whereby flow rate fluctuations both to and from said point may occur at said given pressure value through said higher and lower values of flow rates.

11. A pressure-regulating arrangement comprising:
a source of fluid pressure;
a vortex valve having a control inlet, a supply inlet, a vortex chamber, and an exhaust, said valve having a vertical pressure flow characteristic in a portion of its operating range;
means providing a fluid connection between said fluid source and said control inlet providing a control flow operable to produce a vertical pressure flow response from said vortex valve;
means providing a fluid connection between said fluid source and said supply inlet such that the pressure at said supply inlet corresponds to that at said vertical pressure flow range;
a fluid device;
means providing a controlled total flow to said fluid device and said supply inlet with said total
flow rate corresponding to the highest value of supply flow in said vertical pressure flow operating range, whereby said pressure at said vertical pressure flow point will be maintained over a range of flow rates to said fluid device from zero flow to that equal to the difference between said highest and lowest flow rates in said vertical pressure flow range.

12. A pressure-regulating arrangement comprising:
a source of fluid pressure;
a vortex valve having a control inlet, a supply inlet, a vortex chamber, and an exhaust, said valve including means for providing a vertical pressure flow operating range;
adjustment means providing an adjustable fluid connection between said fluid source and said control inlet;
means providing a fluid connection from said fluid source and said supply inlet;
a fluid device;
means providing a fluid connection from said source to said device;
second adjustment means for adjustably controlling the total flow rate from said fluid source to said supply inlet and said fluid device.

13. The arrangement of claim 12 further including means drivingly connecting said adjustment means so that adjustment of one of said means causes adjustment of the other of said means.

14. The arrangement of claim 13 wherein said means drivingly connecting said first and second adjustment means includes means causing the flow rate produced by said second adjustment means to equal the flow rate occurring at the uppermost portion of the vertical pressure flow range produced by the control flow allowed by said first adjustment means.

* * * * *